United States Patent
Roberts

(10) Patent No.: US 6,460,786 B1
(45) Date of Patent: Oct. 8, 2002

(54) DRIP IRRIGATION TAPE WITH INDICIA

(75) Inventor: James C. Roberts, Escondido, CA (US)

(73) Assignee: Roberts Group Holdings LLC, San Marcos, CA (US)

( * ) Notice: Subject to any disclaimer, the term of this patent is extended or adjusted under 35 U.S.C. 154(b) by 0 days.

(21) Appl. No.: 09/593,797

(22) Filed: Jun. 14, 2000

(51) Int. Cl.⁷ ................................................. B05B 15/00
(52) U.S. Cl. ....................................... 239/542; 239/547
(58) Field of Search ............................... 239/542, 547, 239/566, 568, 533.13, 1; 29/611, 876, 845, 890.1

(56) References Cited

U.S. PATENT DOCUMENTS

| | | | |
|---|---|---|---|
| 3,387,307 A | | 6/1968 | Blatz |
| 3,887,138 A | * | 6/1975 | Gilead ......................... 239/542 |
| 3,961,112 A | | 6/1976 | Genevitz et al. |
| 4,166,580 A | * | 9/1979 | Meckel ........................ 239/542 |
| 4,634,484 A | | 1/1987 | Wagner |
| 4,722,759 A | | 2/1988 | Roberts et al. |
| 4,807,668 A | | 2/1989 | Roberts |
| 5,049,721 A | * | 9/1991 | Parnas et al. .......... 219/121.68 |
| 5,133,707 A | | 7/1992 | Rogers et al. |
| 5,266,257 A | | 11/1993 | Kildune |
| 5,287,397 A | | 2/1994 | Dumsha |
| 5,620,143 A | * | 4/1997 | Delmer et al. ............... 239/547 |
| 5,785,785 A | * | 7/1998 | Delmer et al. ............... 239/542 |
| 6,277,228 B1 | * | 8/2001 | Fabrikant et al. ........... 156/219 |

* cited by examiner

*Primary Examiner*—Lesley D. Morris
*Assistant Examiner*—Davis Hwu
(74) *Attorney, Agent, or Firm*—Brown, Martin, Haller & McClain, LLP

(57) ABSTRACT

Indicia are formed on the outside surface of drip irrigation tape by deforming the strip of flexible material when it is in a semi-molten state and cooling the strip while it is deformed. The indicia may include alphanumeric characters, logos or symbols that convey information. Indicia forming features in the surface of a shaping drum mold the strip of semi-molten material as the semi-molten material cures to form a flexible strip. The flexible strip is folded and sealed to form the drip irrigation tape.

8 Claims, 3 Drawing Sheets

DRIP IRRIGATION TAPE WITH INDICIA

BACKGROUND OF THE INVENTION

The present invention relates generally to irrigation tape and more specifically to drip irrigation tape having indicia and methods of manufacturing irrigation tape having indicia.

Drip irrigation systems are commonly used in agriculture and horticulture to conserve water and reduce costs. A drip irrigation system includes lengths of plastic tubing or tape placed near the roots of plants, either above the ground or embedded in the earth. Drip irrigation tape has numerous small outlets supplying drops of water continuously to the plants. As well as conserving water, the systems provide a uniform water supply to plants which improves crops and reduces salt accumulation and fertilizer loss in the soil.

Drip irrigation tape is commonly fabricated from a thin pliable plastic strip folded lengthwise. The two edges of the tape are overlapped and joined together to form a flat hollow tape. Under pressure, the tape opens out into a generally cylindrical form to provide a main conduit for irrigation water flowing to the irrigation areas. The drip irrigation tape also includes a much smaller secondary conduit, usually located along the seam formed by the overlapping edges of the plastic strip. The smaller conduit is connected to the main conduit to form a narrower passageway for the water flow, reducing the rate that water is released into the soil.

Typically, the drip irrigation tape must be installed in a particular orientation. In most systems, the performance of the drip irrigation system is optimal when the drip irrigation tape is installed with the smaller conduit oriented at the top of the tape, facing up. As a result, irrigation tape may have markings on the tape indicating the proper orientation. For example, one side of the tape may be marked with the words "THIS SIDE UP".

Further, manufacturers of irrigation tape often include markings identifying the manufacturer to indicate the source of the product for advertising purposes or to direct the installer or user of the tape to the appropriate manufacturer for assistance or information.

One known method of marking drip irrigation tape includes printing lettering or other markings directly on the surface after the irrigation tape has been formed. This method, however, has several manufacturing and performance disadvantages.

The marking of irrigation tape using printing techniques requires additional manufacturing equipment that must be maintained. Separate ink printing equipment must be added to the production line to perform the printing process. The additional equipment may require repairs and continuing maintenance such as lubrication and cleaning. Accordingly, the cost of the manufacturing process is increased due to the cost of the equipment, maintenance of the equipment, and additional space required for the extra equipment in the production facility.

Production costs are also increased by the cost of the additional materials required for printing such as ink and cleaning solutions for cleaning the tape prior to the printing process.

Product quality and costs are also affected by indirect manufacturing process issues such as a slowed manufacturing process due to the additional marking process and potential delays in production due to malfunctions and maintenance of the printing equipment. The additional equipment presents additional components that may malfunction resulting in the shutdown of a production line. Maintenance such as ink replacement or lubrication of the additional equipment may result in delays in production.

The required drying time of the ink markings results in delays in the drip irrigation tape packaging process. For example, the drip irrigation tape cannot be wound on a spool until the ink is dry. In addition to the additional drying time, the ink drying process may require additional floor space for drying the irrigation tape within the production facility.

Further, the final ink marked tape is not reliable since ink markings may become hard to read after being submerged in the soil. Chemicals in the soil, temperature changes, and other environmental factors may dull or eliminate the ink markings on the irrigation tape. The ink markings are also susceptible to distortion from abrasions during packaging, installation and use.

Therefore, there exists a need for a drip irrigation tape with indicia that are reliable and are manufactured using an efficient and reliable method that does not increase the production time and reduces the need for additional equipment.

SUMMARY OF THE INVENTION

In an exemplary embodiment of the invention, a strip of semi-molten material is extruded and shaped by deforming the surface of the strip of semi-molten material to form indicia on its surface. While deformed, the strip of semi-molten material is cooled to form a strip of flexible material having indicia. The flexible strip is folded lengthwise and sealed to form the drip irrigation tape with the indicia on an outer surface.

Indicia forming features on a cylindrical surface of a shaping drum form deformations in the surface of the strip of semi-molten material as a compression drum forces the strip of semi-molten material against the shaping drum. In addition to the indicia forming features on the surface of the shaping drum, the shaping drum may also have contours such as grooves that form functional features within the drip irrigation tape. Alternatively, a secondary process may be employed to form a secondary flow channel within the tape, or a component having a pre-formed secondary conduit may be fixed to the tape. Thus, the indicia may be formed first around a first shaping drum, and the strip may then be guided to a secondary process where the secondary flow channel is formed, or vice versa.

BRIEF DESCRIPTION OF THE DRAWINGS

The present invention will be better understood from the following detailed description of some exemplary embodiments of the invention, taken in conjunction with the accompanying drawings in which like reference numerals refer to like parts and in which.

DESCRIPTION OF THE EXEMPLARY EMBODIMENTS

Figure 1:
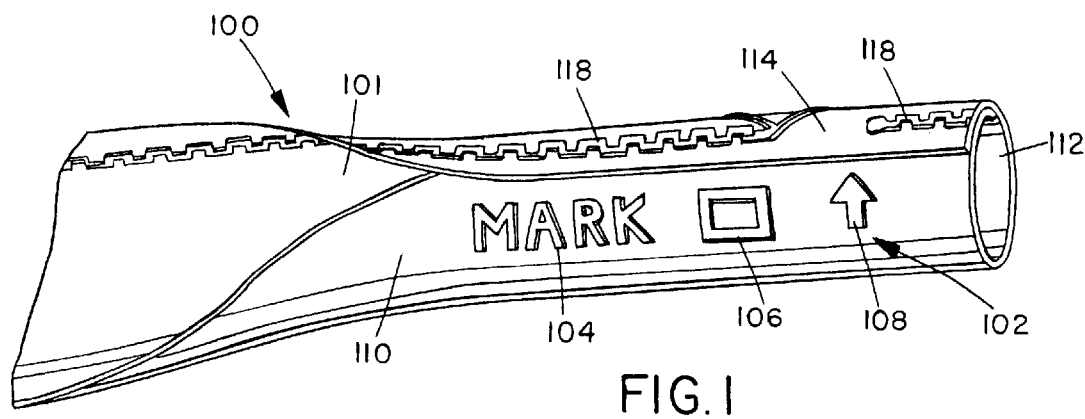
FIG. 1 is an isometric view of a section of drip irrigation tape having indicia in accordance with an exemplary embodiment of the invention.

FIG. 1 is a drawing of a section of drip irrigation tape 100 having indicia 102 in accordance with an exemplary embodiment of the invention. As is discussed below in more detail, the drip irrigation tape 100 is constructed from a strip of flexible material 101 using thin film techniques. Preferably, the strip of flexible material 101 is molded and folded to form at a main conduit 112 and a series of secondary conduits 114. Inlet channels 116 are also formed for supplying water from main conduit 112 to secondary conduit 114. An opening 118 is formed to the outside of the tape at the opposite end of each conduit 114 to inlets 116. The indicia 102 can be any type of marking that conveys information such as an alphanumeric character 104, a logo 106, or symbol 108 and can be used to convey various types of information to the user or the installer of the drip irrigation tape 100 including the manufacturer of the drip irrigation tape 100, phone numbers, serial numbers, model numbers, installation instructions, and other information. For example, the alphanumeric characters 104 can be arranged to form written installation instructions or manufacturer information. In addition to indicating other information such as the size or type of irrigation tape, symbols 108 may be used to convey the proper orientation of the drip irrigation tape 100 when installed.

In one example, the indicia 102 are formed by a solid pattern that is raised beyond the outer surface 110 of the drip irrigation tape 100. For example, if the indicia 102 are to form the alphanumeric character "M" (104), the four lines that form the letter "M" are solid lines interconnected in a raised pattern to depict the letter. Each line of the character protrudes beyond the surface of the irrigation tape 100 making it visible.

Although in the illustrated embodiment raised portions of the strip of flexible material 101 are arranged to form the indicia 102, the indicia 102 may be formed in the outer surface 1 10 using any one of a variety of techniques. For example, the indicia 102 may be formed by creating indentations in the surface of the drip irrigation tape 100. Although the indicia 102 formed by indentations is less likely to be worn by abrasive contact with the soil and other materials, the indentations are more likely to be concealed by dirt after the drip irrigation tape 100 has been in use.

As discussed below in regard to a first alternate embodiment, the indicia 102 may also be formed by raising a broken pattern beyond the surface of the drip irrigation tape 100. For example, the indicia 102 may be formed by raising a series of dots in an arrangement that depicts the character 104, logo 106, or symbol 108.

Other techniques of forming the indicia include forming a textured pattern within an outline of the character 104, logo 106, or symbol 108. For example, a crosshatch pattern can be formed using a plurality of thin crossing lines within an outline of the indicia 102. Further, a combination of the previously discussed techniques may be used to form indicia 102 on the same section of irrigation tape 100 or within the individual alphanumeric character 104, logo 106, or symbol 108.

Therefore, the indicia 102 comprises deformations within the surface of the irrigation tape arranged to form alphanumeric characters 104, logos 106, or symbols 108. The indicia 102 may be used to convey information including the manufacturer of the tape, phone numbers, serial numbers, model numbers, installation instructions, and other information to the user or installer. Since the indica 102 are formed from the flexible material (101) used to form the irrigation tape, the indicia 102 are less susceptible to environmental conditions and can be more efficiently manufactured than indicia produced by prior art methods.

Figure 2:
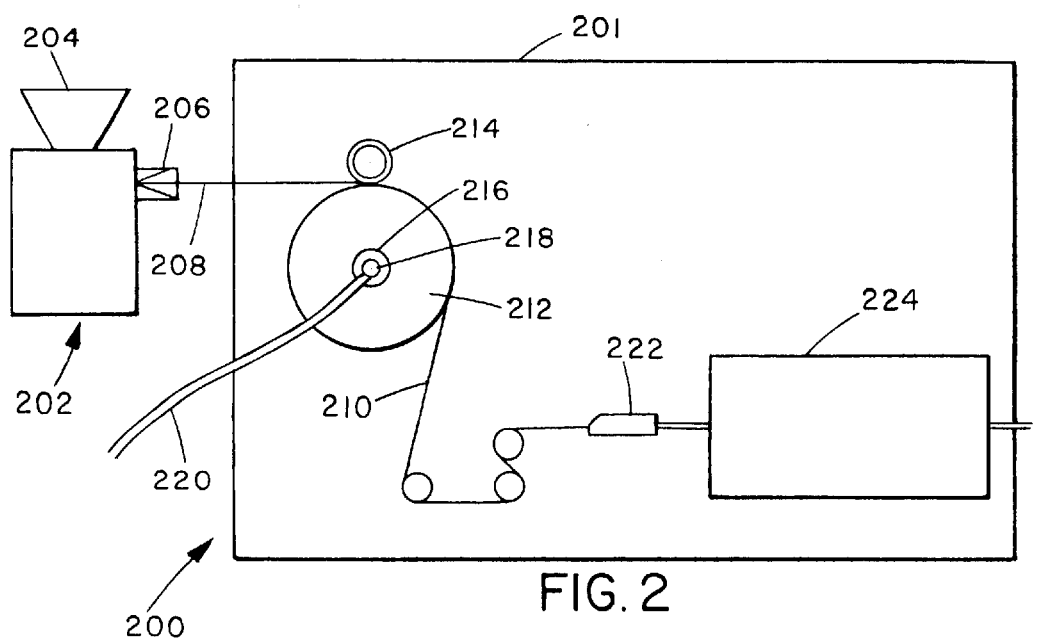
FIG. 2 is side view of a manufacturing apparatus in accordance with a first embodiment of the invention.

FIG. 2 is block diagram of an apparatus for forming drip irrigation tape 100. Except for the techniques and features required to produce the indicia 102, the drip irrigation tape 100 is manufactured using known techniques. Descriptions of a drip irrigation tape 100 manufacturing techniques are found in the following United States patents: U.S. Pat No. 4,722,759, entitled "Apparatus For Fabricating Drip Irrigation Tape", issued on Feb. 2, 1988 to James C. Roberts and David E. Mominee; U.S. Pat. No. 5,318,657, entitled "Drip Irrigation Tape And Method Of Manufacture", issued on Jun. 7, 1994 to James C. Roberts; and U.S. Pat. No. 5,387,307, entitled "Drip Irrigation Tape And Method Of Manufacture", issued on Feb. 7, 1995 to James C. Roberts. However, a brief description of a manufacturing apparatus in accordance with the exemplary embodiment is included immediately below.

The manufacturing apparatus 200 in the exemplary embodiment includes an extrusion device 202 in addition to other components for forming a thin semi-molten film. The extrusion device 202 includes a hopper 204, into which suitable raw material such as polyethylene beads are placed, and an extrusion die 206 through which a thin film flexible polyethylene material is forced.

The strip of flexible material 101 used to make the irrigation tape 100 is referred to by different names depending on the stage within the manufacturing process in order to illustrate the irrigation tape fabrication. When extruded from the extrusion device 202, the strip of flexible material 101 is in a semi-molten state and is referred to as a strip of semi-molten material 208. The strip of semi-molten material 208 is formed into a flexible strip 210 after it is molded and cooled by the shaping drum 212. Drip irrigation tape 100 is formed when the flexible strip 210 is folded and sealed.

A main frame 201 supports the various components employed to fabricate the irrigation tape 100. These components include a compression drum 214 which bears against the flexible strip 208 as it passes over the shaping drum 212 where it is preformed to include functional features such as the channel 116, the opening 118 and the indicia 102.

Preferably, the shaping drum 212 has a circular circumference that includes an extending annular channel and pairs of auxiliary channels that intersect the annular channel at junctions located at regular intervals around the circumference. These channels serve as a form into which the strip is forced during the preforming operation.

The flexible strip 208, which remains heated from the preceding extrusion operation, passes the shaping drum 212 where a vacuum, drawn through suction inlets in the annular channel and channels, sucks the strip into the channels to preform a groove extending lengthwise along one edge.

The shaping drum is rotatably connected by an axle 216 and a bearing 218 to the support frame 201. A vacuum tube 220 supplies the required vacuum to the vacuum inlet ports through a rotary vacuum coupling. As the strip of semi-molten material 208 passes over the shaping drum 212, it cools sufficiently to retain its shape.

In the preferred embodiment, the shaping drum is cooled with water using known techniques to accelerate the cooling of the flexible strip 210. Controlling the temperature of the shaping drum 212 allows more heat to be extracted from the flexible strip 210 and reduces the time required for the flexible strip 210 to contact the shaping drum 212 and cure.

The flexible strip 210 leaves the shaping drum 212 in a molded and cured state. A folding device 222 is a suitable known mechanical structure that folds the flexible strip 210 lengthwise as it passes.

The folded flexible strip 210 may be heat sealed by a sealing assembly 224 using known techniques. The two edge portions of the flexible strip 210 are bonded together by pressing them together while they are heated. Other methods, however, may be used to seal the two edge portions of the flexible strip 210. For example, the flexible strip 210 may be sealed with an adhesive or by ultrasonic welding.

Figure 3:
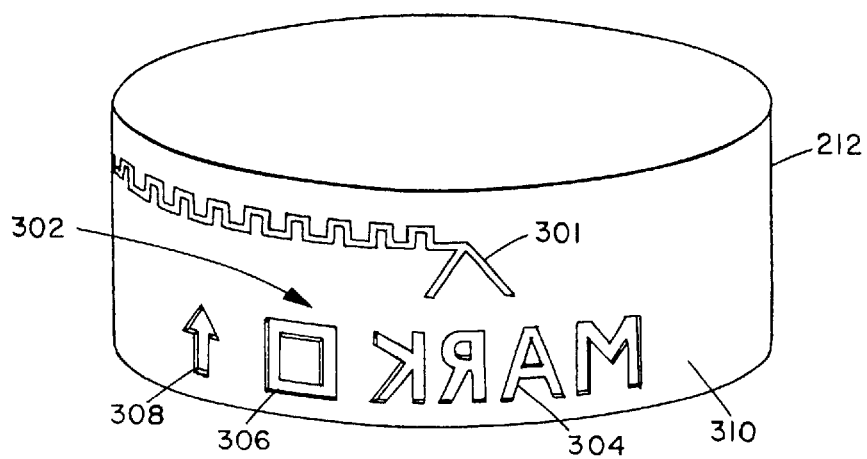
FIG. 3 is an isometric view of a shaping drum in accordance with the exemplary embodiment of the invention.

FIG. 3 is an isometric drawing of the shaping drum 212 in accordance with one embodiment of the invention. Other than the indicia forming features 302 for forming the indicia 102, the shaping drum 212 is constructed using known techniques. The shaping drum 212 includes contours 301 for forming channels 114, inlets 116, openings 118 and other functional features in the irrigation tape as well as indicia forming features 302 for producing the indicia 102 on the irrigation tape 100. The indicia forming features 302 include alphanumeric forming features 304, logo forming features 306 and symbol forming features 308. In the preferred embodiment, the indicia forming features 302 are indentations on the surface of the shaping drum 212. The indentations 302 function as molds that receive the semi-molten material 208 as it is pressed against the cylindrical surface 310 of the shaping drum 212 by the compression drum 214. As the shaping drum 212 rotates during the manufacturing process, the strip of semi-molten material 208 cures within the indentations forming the indicia 102 on the flexible strip 210.

In the exemplary embodiment, the indicia forming features 302 are smooth, rounded indentations in the surface of the shaping drum that allow the deformed portions (indicia 102) of the irrigation tape to cure and exit easily. The depth of the indicia forming features 302 may be small compared to the depth of the contours 301. The indentations, however, may have a variety of shapes and sizes depending on the type of indicia 102, material (101) and manufacturing process. The indicia forming features 302 may also include vacuum holes to draw the strip of semi-molten material 208 into the indentations. Vacuum holes may be particularly useful for larger indicia forming features 302.

Alternatively, the indicia forming features may be located on the compression drum 214 rather than the shaping drum. In another alternative, the indicia forming features 302 may include indicia forming protrusions that extend beyond the cylindrical surface 310 of the shaping drum 212. The indicia forming protrusions create indentations in the surface 110 of the drip irrigation tape 100 to form the indicia 102. During the manufacturing of the drip irrigation tape 100, the compression drum 214 presses the semi-molten material 208 against the protrusions to form the indentations within the surface 110 of the flexible material 101. The protrusions may include solid lines or a series of raised bumps on the cylindrical 310 surface of the shaping drum 212.

As discussed above, the flexible strip 210 is folded after leaving the shaping drum 212. In the exemplary embodiment, the flexible strip 210 is folded such that the protruding portions (bumps) of the indicia 102 are located on the outer surface of the irrigation tape. Since the surface of the flexible strip 210 that faces the shaping drum 212 is the outer surface 110 of the drip irrigation tape 100, the indicia forming features 302 on the shaping drum 212 are mirror images of the indicia 102 that are formed on the flexible strip 210. If the indicia forming features 302 are protrusions from the cylindrical surface 310 of the shaping drum 212, the indicia 102 comprises indentations in the outer surface 110 of the drip irrigation tape 100.

In an alternate embodiment, the flexible strip 210 may be folded such that the surface of the flexible strip 210 facing the surface of the shaping drum 212 forms the inner surface of the drip irrigation tape. In this case, the indicia forming features 302 are similar to the indicia 102 and are not the mirror image of the indicia 102 since the image formed is "reversed" by exposing the opposite side of the flexible strip 210. The indicia 201 must be sufficiently deep within the flexible strip 210 to protrude on the opposite side of the flexible strip 210 to be visible if the flexible strip 210 is folded in such a way. Accordingly, if the indicia forming features 302 are indentations in the surface of the shaping drum, the indicia 102 are indentations in the surface of the irrigation tape rather than protrusions.

In the alternative version having the indicia forming features located on the compression drum 217, the flexible strip 210 may be folded such that the surface facing the shaping drum 212 forms the inner surface of the drip irrigation tape. This places the indicia on the outer surface of the drip irrigation tape.

Figure 4:
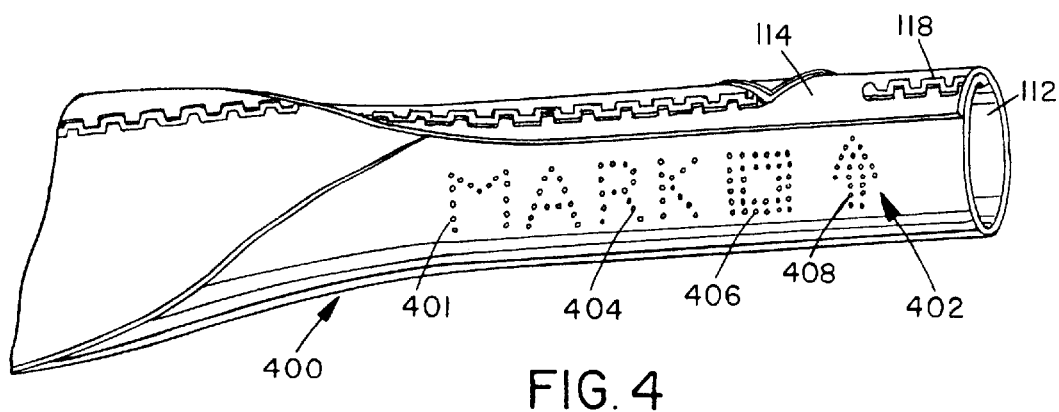
FIG. 4 is an isometric view of a section of drip irrigation tape having pointillistic indicia in accordance with an alternate embodiment of the invention.

FIG. 4 is a drawing of a section of irrigation tape having indicia 402 in accordance with the first alternate embodiment of the invention. The drip irrigation tape 400 in the first alternate embodiment is similar in construction to the drip irrigation tape 100 in the preferred embodiment except for the indicia 402. In the first alternate embodiment, the indica 402 is formed using a broken pattern rather than solid lines to form a pointillistic image. The indicia 402 comprise a plurality of pointillistic deformations 401 such as circular or dome-shaped dots 401 protruding from the surface 110 of the drip irrigation tape 400. The dome-shaped dots 401 are sufficiently close to each other to allow their aggregation to form an image of an alphanumeric character 404, logo 406 or symbol 408 on the surface 110 of the irrigation tape 400. Although in the first alternate embodiment the pointillistic deformations 401 are dome-shaped protrusions, the pointillistic deformations 401 may be indentations in the surface of the irrigation tape 400 or any other type of deformation that forms a pointillistic image of the alphanumeric character 404, logo 406, or symbol 408.

Figure 5:
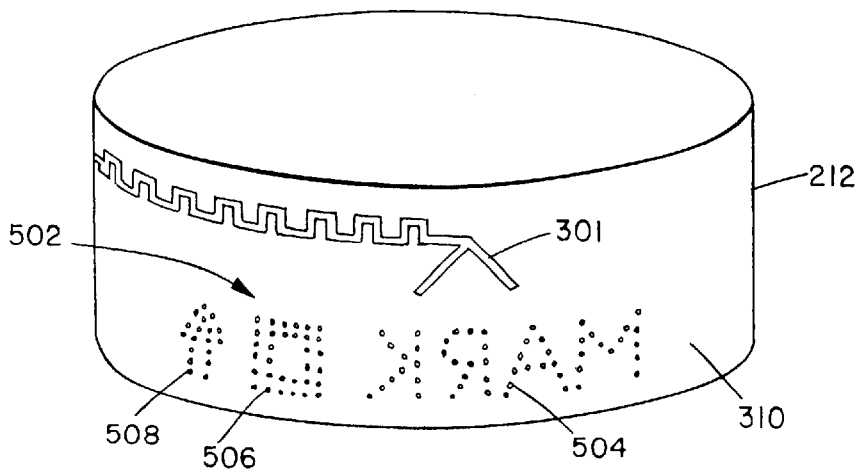
FIG. 5 is an isometric view of a shaping drum in accordance with the alternate embodiment of the invention.

FIG. 5 is an isometric view drawing of a shaping drum 212 in accordance with the first alternate embodiment of the invention. The shaping drum 212 is constructed as described above except that the indicia forming features 502 comprise a plurality of pointillistic forming features 502. The plurality of pointillistic forming features 502 form an alphanumeric character 504, logo 506 or symbol 508. Preferably, the pointillistic forming features 502 are small dome-shaped indentations in the cylindrical surface 310 of the shaping drum 212. The flexible strip 210 is pressed against the shaping drum 212 to force small portions of the flexible strip 210 into the dome-shaped molds. As the flexible strip 210 cools, the pointillistic indicia 402 is formed on the surface of the drip irrigation tape 400.

Although in the first alternate embodiment, the pointillistic forming features 502 comprise a plurality of indentations, the pointillistic forming features 502 may include protrusions or other types of features that form a plurality of deformations on the surface 110 of the irrigation tape to form the pointillistic indicia 402.

As explained above, the indicia 102 may be formed with a variety of structures such as a cross-hatch or other textured pattern or a combination of indentations, protrusions and textured patterns. The shaping drum 212 is constructed in accordance with the desired type of indicia 102. The indicia forming features 302, therefore, may include indentations, protrusions and textured patterns in various combinations to create the desired indicia 102.

Figure 6:
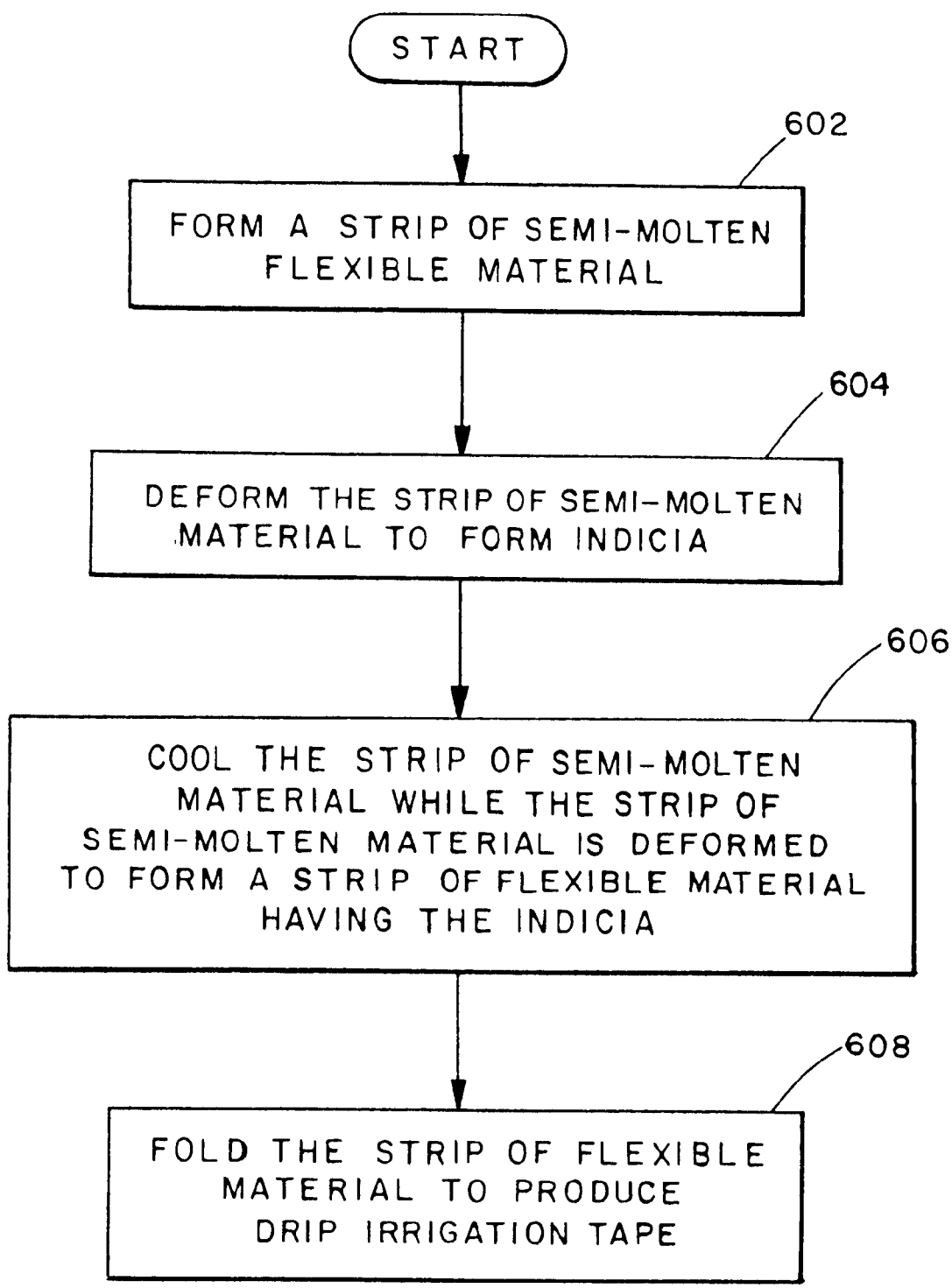
FIG. 6 is a flow chart of a method of manufacturing drip irrigation tape having indicia in accordance with the first embodiment of the invention.

A flow chart of a method of manufacturing drip irrigation tape 100 having indicia 102 in accordance with the exemplary embodiment of the invention is shown in FIG. 6. At step 602, the strip of semi-molten material 208 is extruded from the extrusion device 202.

At step 604, the strip of semi-molten material 208 is deformed to form the indicia 102. The strip of semi-molten material 208 may be deformed by pressing the strip of semi-molten material 208 against the shaping drum 212 having indicia forming features 302. As described above, the indicia forming features 302 are indentations in the surface 310 of the shaping drum 212. The indentations function as molds and receive portions of the strip of semi-molten material 208 as the strip 208 is pressed against the shaping drum 212 by the compression drum 214. The shaping drum 212 also has contours 301 such as molding grooves for forming channels 116, openings 118, and other functional features in the drip irrigation tape 100.

At step 606, the strip of semi-molten material 208 is cooled while the strip 208 is deformed to form the strip of flexible material 210 having the indicia 102. The shaping drum 212 is maintained at a controlled cool temperature by passing cold water through it. The strip of semi-molten material 208 cures as heat is extracted from the strip of semi-molten material 208 to the shaping drum 212. The deformed portions cure within the indentations to form the indicia 212. As the shaping drum 212 continues to rotate, the flexible strip 210 is released from the shaping drum 212.

The flexible strip 210 is folded to produce the drip irrigation tape 100 at step 608. As described above, a folding device 222 folds the two end portions which are sealed together by the sealing assembly 224.

Figure 7:
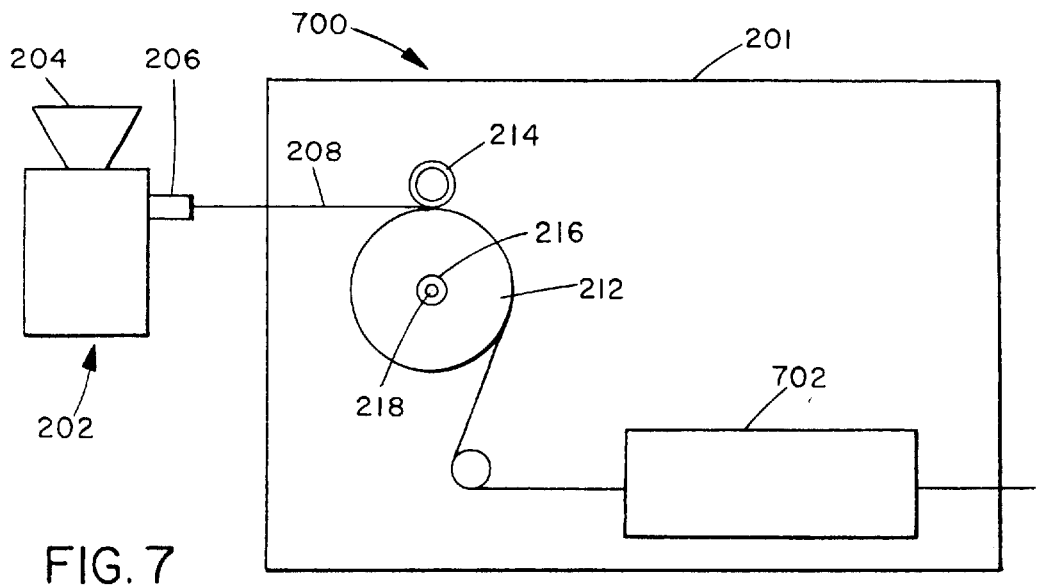
FIG. 7 is a side view of a modified manufacturing apparatus in accordance with another embodiment of the invention.

FIG. 7 is a block diagram of a modified apparatus 700 for forming drip irrigation tape 100, which is similar to apparatus 200 of FIG. 2 and like reference numerals have been used for like parts as appropriate. However, unlike apparatus 200 where a single shaping drum 212 is used to form both the secondary conduit structure and the indicia, in this embodiment only the indicia are formed at shaping drum 212. The tape with indicia is then folded, and the secondary conduit is formed, or a component including a pre-formed secondary conduit is fixed to the tape. The tape is then sealed in a secondary process 702. Such single step processes for folding tape, forming the conduit and sealing the tape are known in the field, as described, for example, in U.S. Pat. No. 4,473,191 of Chapin, U.S. Pat. No. 4,247,051 of Allport, and U.S. Pat. No. 5,522,551 of DeFrank. Thus, except for the techniques and procedures for forming indicia 102, the tape 100 is manufactured using known techniques.

The first shaping drum 212 will therefore be substantially identical to the drum as illustrated in FIG. 3, but without the channel or conduit forming contours 301. As in the previous embodiment, a compression drum 214 opposes the shaping drum and bears against the flexible strip 208 as it passes over the shaping drum 212, where it is preformed to create the indicia 102.

The shaping drum is rotatably connected by an axle 216 and a bearing 218 to the support frame 201. The shaping drum 212 is cooled with water using known techniques to accelerate the cooling of the flexible strip. As the strip of semi-molten material 208 passes over the shaping drum 212, it cools sufficiently to retain its shape.

The flexible strip with indicia leaves the shaping drum 212 in a molded and cured state. The secondary process 702 is used to form a series of secondary conduits, fold the flexible strip lengthwise, and seal the two edge portions of the flexible strip to form the tape.

Therefore, information such as a company name or logo, model numbers or installation directions are formed on the surface 110 of the drip irrigation tape 100 without significant additional materials or equipment. The indicia 102 is formed on the drip irrigation tape 100 efficiently and with less expense than prior art systems. Further, the method of manufacturing the drip irrigation tape 100 with indicia 102 does not require additional equipment and does not increase the production time.

Other embodiments and modifications of the present invention will occur readily to those of ordinary skill in the art in view of these teachings. Such persons will appreciate the symmetries among the various embodiments illustrated above and understand that their elements may be arranged in other ways to produce similar results. For example, a logo 106 can be formed with solid lines next to pointillistic alphanumeric characters 404 without departing from the scope of the invention. Further, the indicia 202 may include indentations and protrusions on the surface 110 of drip irrigation tape 100. Therefore, this invention is to be limited only by the following claims, which include all such other embodiments and modifications when viewed in conjunction with the above specification and accompanying drawings.

I claim:

1. A drip irrigation tape comprising:
   a main conduit of flexible material formed into a tube;
   a secondary conduit having at least one inlet communicating with the main conduit and at least one outlet at a fixed distance from said inlet;
   the main conduit having an outer surface having a plurality of deformations arranged to form spaced, separate indicia, each deformation comprising an indentation of predetermined shape formed by deforming the material of the main conduit; and
   the deformations comprising raised portions of flexible material extending beyond the outer surface of the main conduit.

2. A drip irrigation tape in accordance with claim 1, wherein the secondary conduit comprises at least one channel of predetermined shape extending in a predetermined path along the tape, and said indicia are laterally spaced from said secondary conduit and outside said secondary conduit.

3. The tape according to claim 1, wherein said tape comprises a single layer strip having opposite outer and inner side edge portions which overlap and are secured together to form said main conduit, said secondary conduit being formed in the overlapping outer side edge portion of said strip, and said indicia being spaced from said overlapping side edge portions in a non-overlapping, single layer portion of said tape.

4. A drip irrigation tape in accordance with claim 1, wherein the indicia comprise alphanumeric markings.

5. A drip irrigation tape in accordance with claim 4, wherein the alphanumeric markings comprise a word.

6. A drip irrigation tape in accordance with claim 1, wherein the indicia, comprise a logo.

7. A drip irrigation tape in accordance with claim 1, wherein the indicia comprise information relating to a physical specification of the drip irrigation tape.

8. A drip irrigation tape in accordance with claim 1, wherein the indicia comprise a name identifying the source of the drip irrigation tape.

* * * * *